E. M. THOMPSON.
MEANS FOR COMPENSATING SPEEDOMETERS AND SIMILAR DEVICES FOR TEMPERATURE VARIATIONS.
APPLICATION FILED NOV. 2, 1910.
1,134,649.
Patented Apr. 6, 1915.
2 SHEETS—SHEET 1.
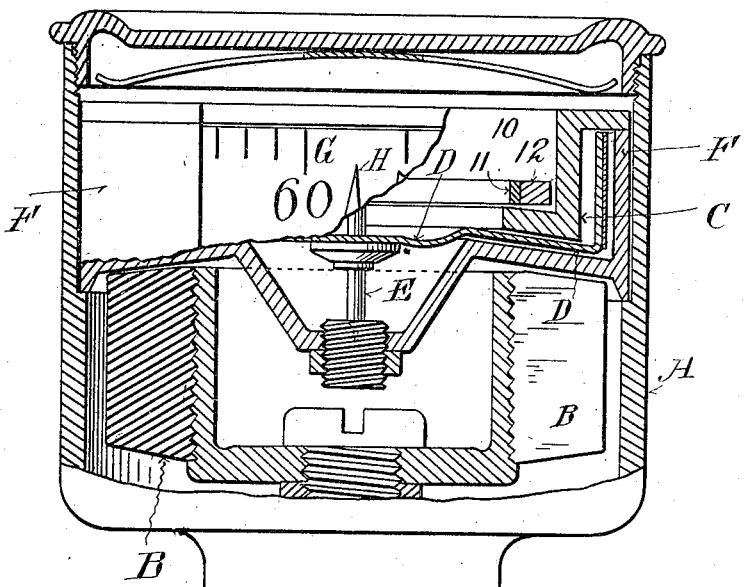
Fig. 1.
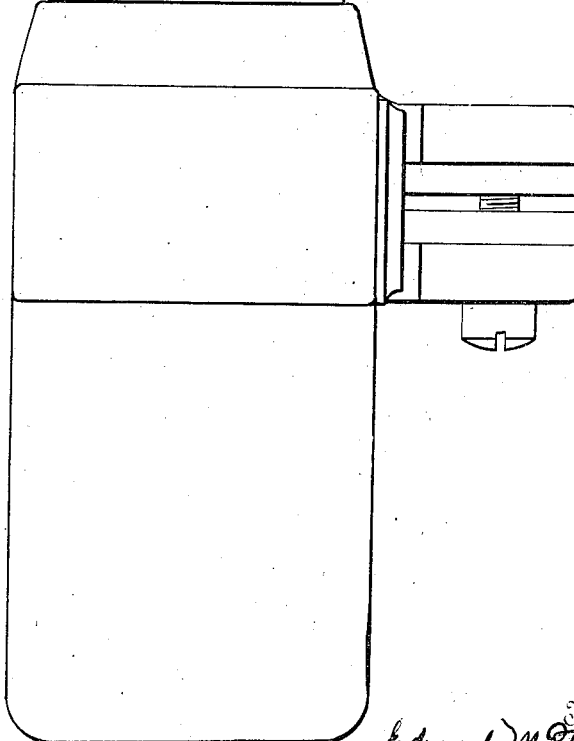
Witnesses:
Inventor
Edward M. Thompson
By his Attorney
Samuel E. Darby

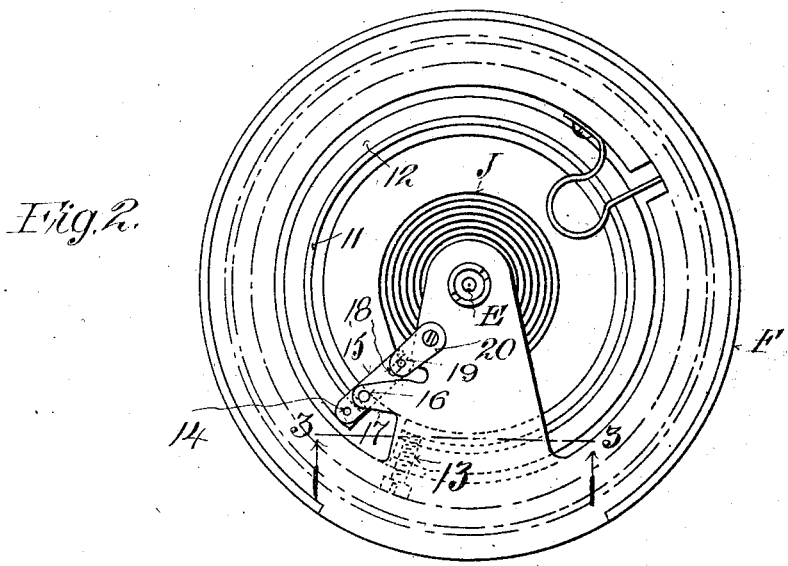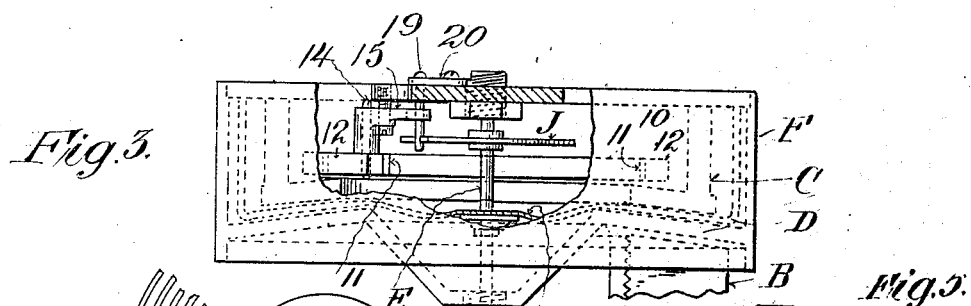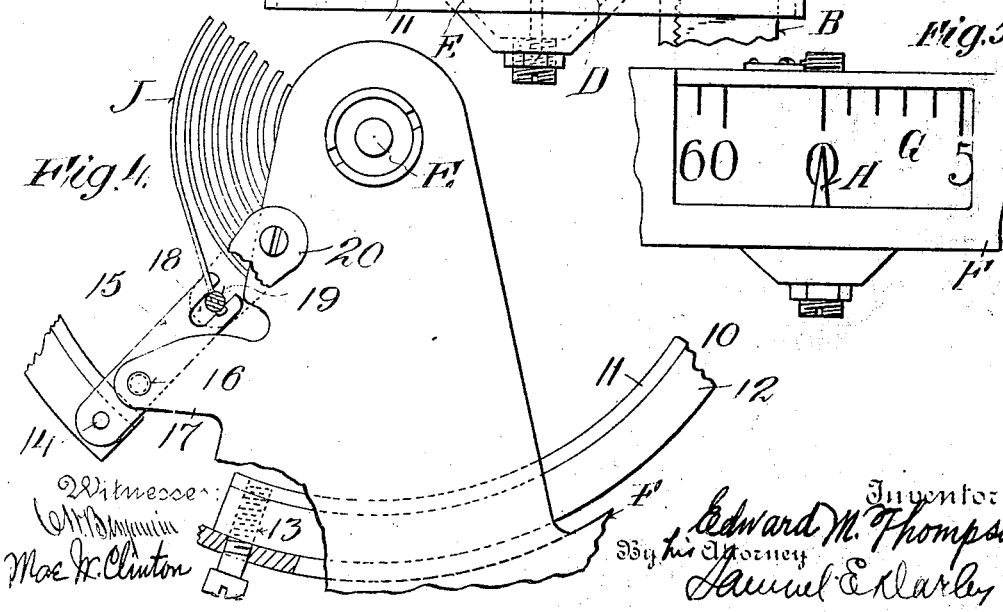

UNITED STATES PATENT OFFICE.

EDWARD M. THOMPSON, OF BELOIT, WISCONSIN, ASSIGNOR TO STEWART-WARNER SPEEDOMETER CORPORATION, A CORPORATION OF VIRGINIA.

MEANS FOR COMPENSATING SPEEDOMETERS AND SIMILAR DEVICES FOR TEMPERATURE VARIATIONS.

1,134,649.  Specification of Letters Patent.  Patented Apr. 6, 1915.

Application filed November 2, 1910. Serial No. 590,275.

*To all whom it may concern:*

Be it known that I, EDWARD M. THOMPSON, a citizen of the United States, residing at Beloit, county of Rock, State of Wisconsin, have made a certain new and useful Invention in Means for Compensating Speedometers and Similar Devices for Temperature Variations, of which the following is a specification.

The invention relates generally to devices of the class known as tachometers, and, particularly to speed indicating devices, such, for instance, as are employed in connection with automobiles to indicate their speed of travel.

The object of the invention is to provide means which are simple and efficient for automatically compensating instruments of the class referred to, for temperature variations, whereby to automatically secure accuracy of speed indications at different atmospheric temperatures.

Other objects of the invention will appear more fully hereinafter.

The invention consists substantially of the construction, combination, location and relative arrangement of parts, all as will be more fully hereinafter set forth, as shown in the accompanying drawings, and finally pointed out in the appended claims.

Referring to the accompanying drawings and to the various views and reference signs appearing thereon, Figure 1 is a view in partial vertical central section of a form of magnetic speed indicating instrument showing the application thereto of means for compensating for variations in atmospheric temperatures. Fig. 2 is a top plan view of a portion of the instrument showing the manner of applying the automatic compensating means. Fig. 3 is a view in side elevation of the construction shown in Fig. 2, and partly in section on the line 3, 3, Fig. 2, looking in the direction of the arrows. Fig. 4 is an enlarged broken detail view in top plan, parts broken out, showing the arrangement of the automatic compensating means. Fig. 5 is a broken view in elevation, showing one form of scale arrangement employed in connection with instruments of the class referred to.

The same part is designated by the same reference character wherever it occurs throughout the several views.

has been the custom to adjust the parts to give accurate readings at an average mean temperature. For ordinary purposes of use of the instruments this is usually sufficient since the variations in indications due to changes in atmospheric temperature under the conditions of use of the instruments, particularly as automobile speed indicators, is small. That this is true will be evident when it is considered that, ordinarily, the automobile is not extensively used in extremely cold weather, and seldom in climates where subjected to excessively high temperatures. It may sometimes, however be desirable to make compensating adjustment for even the small variations of the indications of instruments of the class referred to, due to varying atmospheric temperature conditions under which the instrument is used, and whereby an accurate and correct indication is given at all temperatures. The accomplishment of this result is among the special objects and purposes of my invention.

In instruments of this class the desired speed indications are made by means of an associated scale and pointer or hand, one of these parts being fixed and the other arranged to be rotatively displaced proportionally to the speed to be indicated. The rotatively displaceable member is usually held yieldingly in an initial or "zero" position and is rotatively displaced from such initial position and against the action of a hair or other spring. The means for rotatively displacing the movable member of the scale and pointer mechanism may be varied throughout a wide range and various constructions, both mechanical, centrifugal and magnetic, are at present on the market for performing this duty. While, therefore, I have shown and will describe my invention as applied to a speed indicator of the magnetic type, that is, of the type in which the movable element of the scale-and-pointer device is rotatively displaced by means of a rotating magnetic field, it is to be understood that my invention as defined in the claims, is not to be limited or restricted to any particular type of instrument.

In the magnetic type of instrument the movable member of the scale-and-pointer device is usually associated with a disk cup or other convenient form of device or member arranged within the influence of a rotating magnetic field, and of such material as to be influenced and rotatively displaced against the action of the hair spring by the magnetic drag of the rotating magnetic field.

Various arrangements of means for producing the rotating magnetic field are embodied in instruments now on the market, and while I have shown and will describe one form of means for accomplishing the desired results, my invention, as defined in the claims is not to be limited or restricted to this particular arrangement.

In carrying out my invention I propose to employ a thermostatic or other device capable of being influenced by variations in atmospheric temperatures and having suitable connection to the hair or other spring employed to yieldingly resist the rotative action imposed by the rotating magnetic field upon the movable part of the scale-and-pointer device, in such manner as to vary the effective tension of said spring by and in proper proportional relation to the variations in atmospheric temperature.

Many specifically different constructions and arrangements may be devised for carrying this arrangement into practical operation. While, therefore, I have shown, and will now describe, one form of means for accomplishing the desired objects, my invention, as defined in the claims, is not to be limited or restricted in their broadest scope to the particular construction herein set forth.

In the drawings A, designates a casing in which is mounted to rotate a magnet B, rotation being imparted to the magnet by suitable connection with the shaft or other part the speed of which is to be indicated. Coöperating with the magnet is a magnetic mass C, for the purpose of concentrating the magnetic field. In the particular form shown, to which, however, my invention, as defined in the claims, is not to be limited, the mass C, is stationary, and is carried in an auxiliary case F, adapted to be mounted in the main case A, of the instrument. Interposed between the magnet B, and mass C, or in such relation thereto as to be cut by the lines of force of the magnetic field maintained between said magnet and mass, is a member D, which is mounted on a spindle E, journaled in suitable bearings in the auxiliary case F. In this instance the member D constitutes the rotative or movable part of the scale-and-pointer part of the instrument, and carries the scale G, see Fig. 5, with which coöperates the pointer H. The scale member D, is normally held in an initial or zero position by means of the hair spring J, which is connected at one end to spindle E, and is so arranged with reference thereto as to yieldingly resist the rotative movements of the spindle.

The parts so far described, as above indicated, may be of the usual or any well known type and construction, and in the specific details of structure and arrangement thereof form no part of my present invention, and may, therefore, be changed and varied throughout a wide range.

Reference numeral 10, designates a thermostatic device, that is, a device which is sensitive to heat variations, and which, in the particular construction shown comprises two strips 11, 12, of metal possessing different coefficients of expansion or contraction under the influence of heat, such, for instance as brass and steel. In the form shown these metal strips 11, 12, are secured together in the form of a compound split ring. One end of this split ring is secured to a fixed part of the auxiliary case F, as, for instance, by means of the screw 13. The other end of the split thermostatic ring is free and carries a pin 14, upon which is pivoted, at one end, a lever 15. This lever is pivoted upon a fulcrum pin 16, carried in an arm or extension 17, of a fixed part of the case. At its free end lever 15 is forked, as indicated at 18, to straddle a pin 19, carried in or connected to the free end of the hair spring J. The pin 19 is also carried by or connected to a rocking or swinging arm 20, pivoted upon a fixed part of the stationary auxiliary case F. The arm 20, it will be observed serves as a rocking keeper for the pin 19, which is connected to the end of the spring J. The slot 18 in the lever 15, permits the pin 19, to move in the arc of a circle about the pivot of arm 20, while lever 15 rocks about its fulcrum pin 16.

While I have shown and described in detail a specific structure of temperature compensating device and connections, it will be understood that my invention, as defined in the claims, is not to be limited or restricted to that specific structure, the essential features being the provision of thermostatic devices having connection with the hair or other spring which yieldingly resists the rotative movements imparted to the movable member of the scale-and-pointer devices of a speed indicator, the connections being such as to vary the effective tension of the spring in substantially exact relation and proportion to variations in atmospheric temperature, thereby correspondingly varying the yielding resistance to the rotative movement of the movable member of the scale and pointer devices.

The operation of the specific structure shown is very simple. The variations in atmospheric temperature affect the thermostatic ring, causing movements of its free end, thereby rocking lever 15, about its fulcrum 16, and hence, through the engagement of the slotted end of said lever with the pin 19, causing said pin to move in a path determined by the swinging arm 20, which carries it, thereby correspondingly varying the effective tension of the spring J.

Many variations and changes in the details of structure and arrangement would readily occur to persons skilled in the art without departure from the spirit and scope of my invention as defined in the claims.

Having now set forth the objects and nature of my invention and one form of construction embodying the principles thereof, and having explained such construction and its mode of operation, what I claim as new and useful and of my own invention, and desire to secure by Letters Patent is,—

1. In a speed indicating device, a scale member, a pointer associated therewith, a spindle connected to one of these parts, a spring connected at one end to said spindle and carrying a pin at its other end, a pivotally mounted keeper arm for said pin, a pivoted lever engaging said pin, a thermostatic device connected to said lever for rocking the same, and means operated by the shaft, the speed of which is to be indicated, for rotatively moving said spindle against the action of said spring.

2. In a speed indicating device, a scale member, a pointer associated therewith, a spindle connected to one of these parts, a spring connected at one end to said spindle and carrying a pin at its other end, a pivotally mounted lever having loose connection at one end with said pin, a thermostatic device connected to the other end of said lever for rocking the same, and means operated by the shaft or part, the speed of which is to be indicated for rotatively displacing said spindle against the action of said spring.

In testimony whereof I have hereunto set my hand in the presence of the subscribing witnesses, on this 29th day of October A. D., 1910.

EDWARD M. THOMPSON.

Witnesses:
 M. R. BURNS,
 W. A. ROSE.